(12) United States Patent
Mantzivis

(10) Patent No.: US 8,481,614 B2
(45) Date of Patent: Jul. 9, 2013

(54) MASTERBATCH PREPARATION PROCESS

(76) Inventor: Lionel Nicholas Mantzivis, Befordview (ZA)

( * ) Notice: Subject to any disclaimer, the term of this patent is extended or adjusted under 35 U.S.C. 154(b) by 267 days.

(21) Appl. No.: 12/668,400

(22) PCT Filed: Aug. 26, 2008

(86) PCT No.: PCT/ZA2008/000077
§ 371 (c)(1),
(2), (4) Date: Jun. 9, 2010

(87) PCT Pub. No.: WO2009/009808
PCT Pub. Date: Jan. 15, 2009

(65) Prior Publication Data
US 2010/0261810 A1    Oct. 14, 2010

(30) Foreign Application Priority Data
Jul. 10, 2007   (ZA) .................................. 2007/5644

(51) Int. Cl.
*C08J 3/20*      (2006.01)

(52) U.S. Cl.
USPC .......................................................... 523/351

(58) Field of Classification Search
USPC .......................................................... 523/351
See application file for complete search history.

(56) References Cited

U.S. PATENT DOCUMENTS
2007/0100056 A1    5/2007   Uosaki et al.

FOREIGN PATENT DOCUMENTS

| | | |
|---|---|---|
| EP | 0365 399 | 4/1990 |
| EP | 1 520 876 A1 | 4/2005 |
| EP | 1 642 925 A1 | 4/2006 |
| WO | WO 01/44387 A2 | 6/2001 |
| WO | WO 02/42042 A1 | 5/2002 |
| WO | WO 2008/046535 A1 | 4/2008 |

*Primary Examiner* — Edward Cain
(74) *Attorney, Agent, or Firm* — Merchant & Gould P.C.

(57) ABSTRACT

The process of the present invention provides a novel way of producing a masterbatch or polymer improver by heating a wax or polymer with a low temperature and mixing the molten wax with a additives, including pigments, at a low temperature above the congealing point of the wax to create a carrier material, in doing so this process will not degrade the pigment or additive which will be mixed together.

15 Claims, 1 Drawing Sheet

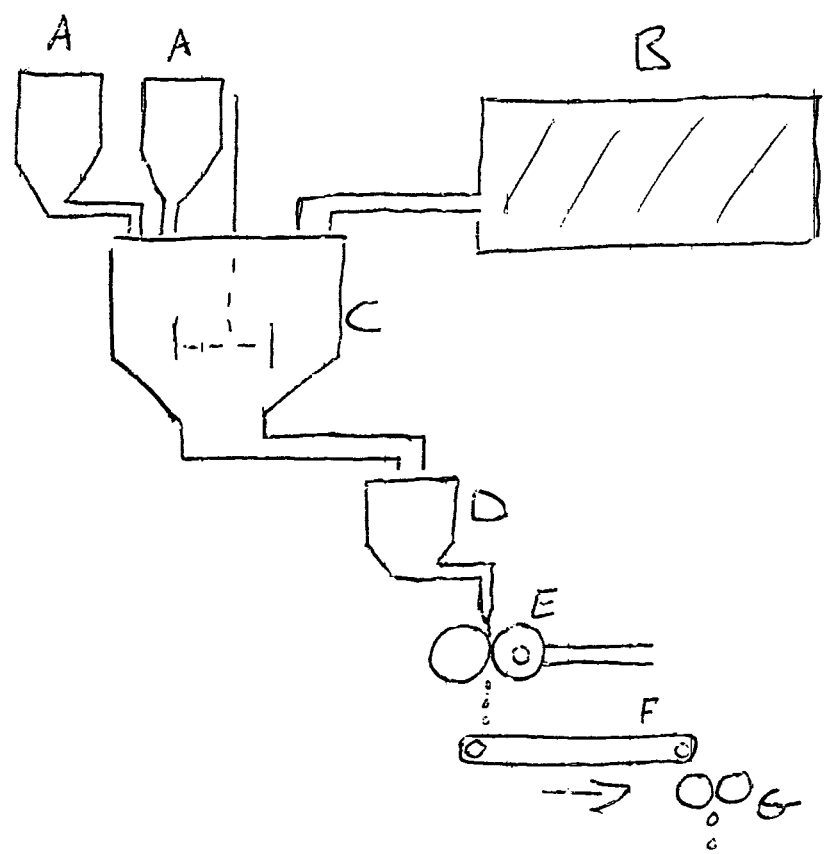

MASTERBATCH PREPARATION PROCESS

This application is a National Stage Application of PCT/ZA2008/000077, filed 26 Aug. 2008, which claims benefit of Ser. No. 2007/5644, filed 10 Jul. 2007 in South Africa and which applications are incorporated herein by reference. To the extent appropriate, a claim of priority is made to each of the above disclosed applications.

FIELD OF THE INVENTION

The invention relates to the preparation of a masterbatch for use in plastics manufacture, for example, moulding and extruding.

BACKGROUND TO THE INVENTION

Plastics have a wide use and there are many types of industries from liquid containers to fibres. Many of the products are used in the fast moving consumer industry and require colour for visual presentation.

It is the masterbatch industry that supplies the colour additives to the plastic industry and the pigment is commonly suspended in a polymer. Masterbatch manufacturers use high speed mixers or internal mixers to first mix the pigment and this is then fed through an extruder with high temperatures and high pressures to combine the pigments and the carrier and to form a granule.

The ideal properties of the pigment are for a high dispersion in the base material, common problems are that the pigment or other materials are subject to high temperatures as well as high pressures to combine them, as well as high sheet in the initial stages, this leads to degradation of the material as well as reagromalation of the pigment.

Dispersion is therefore reduced due to the non-uniform particle size in the material i.e., a mix with a one micron particle size ends up with a percentage of higher micro particles, thus affecting the final distribution. The final colour, tint strength are affected by these various processes.

SUMMARY OF THE INVENTION

The invention provides a masterbatch preparation process, said process including:
blending one or more of a molten wax and a non-wax polymer, and one or more additives;
tempering the blend or cooling the blend to just above the congealing point thereof;
solidifying the blend by cooling; and
comminuting said solidified blend.

The non-wax polymer may have a congealing point and a melting point within 10° C.

The polymer congealing and melting points may be within 5° C.

The additive may be a polymer.

The polymer may be an elastomer, a plasticiser, EVOH, EVA, or the like.

The blend may include another polymer besides the molten wax. This polymer may have a substantially higher melting point and be in particulate form during the blending.

The solidifying may be achieved by dispensing the blend onto a cooled surface.

The cooled surface may be a chilled dimpled roller surface whereby upon solidifying dimple sized pellets of the blend are formed.

The solidified blend may be scraped from the roller surface.

The pellets which have been released from the roller surface may be milled or ground to form fine particles of the solidified blend which are useable as a masterbatch.

The additives may be selected from pigments and filler material.

The filler material may be calcium or other inorganic material.

The blend may include a powdered additive.

The blend may include a liquid additive.

The blend may include fiber which is dispersed into the masterbatch.

The blend may be a dry blend of additives with a polymer and a wax.

The wax may have a narrow carbon number range spread.

The wax may have a substantially constant melting point.

The wax may be a modified wax, for example oxidized or functionalized, natural wax, or a speciality wax such as a aminde or metallocene wax, or a blend thereof.

The wax may be a non-polar wax.

The wax may be a polar wax such as a polyethylene wax.

The wax may be a paraffin wax, micro-crystalline wax, polyethylene, and/or polypropylene wax.

The wax may be a Fischer-Tropsch wax.

The additives may include one or more of calcium carbonate, titanium, pigment, or the like.

The process may include homogenizing one or more of the blend components.

The process may include homogenizing and dispersing wax into a polymer to form a carrier.

The process may include homogenizing and dispersing wax into a polymer to form a mixture.

The process may include homogenizing and dispersing liquid additive into wax and/or polymer to form a mixture.

The process may include homogenizing and dispersing powdered additive into wax and/or polymer to form a mixture.

The process may include homogenizing and dispersing fiber into wax and/or polymer to form a mixture.

The process may include drying the blend prior to the wax being melted.

The blending may take place in a heated blender.

The process is carried out a low pressure, typically without any overpressure i.e. at normal atmospheric conditions wherever the process is being carried out. This is unlike current processes which employ high pressures in extruders and the like to combine the masterbatch ingredients.

The process may produce a masterbatch including 40 mass % titanium dioxide. This masterbatch is believed to have the same whitening effectiveness as a 75 mass % titanium dioxide masterbatch using conventional preparation processes.

The process may produce a masterbatch including in excess of 80 mass % titanium dioxide, typically in excess of 90 mass %.

The process is carried out at low temperatures, typically below 100° C.

The process is a low shear process for preparing the masterbatch.

The masterbatch product may be in the form of prills, flakes, granules, a powder, or the like.

The masterbatch may contain from 1 mass % to 99 mass % wax.

The masterbatch may contain from 1 mass % to 99 mass % polymer.

The powdered additive may be selected from calcium carbonate, talc, titanium dioxide, antimony, or the like.

The fiber in the masterbatch may be selected from natural and synthetic fibers, for example, glass, carbon fiber, and wood.

DESCRIPTION OF EMBODIMENTS OF THE INVENTION

The invention will now be described, by way of non-limiting example only, with reference to the accompanying diagrammatic drawing.

In the drawing,

FIG. 1 shows a diagrammatic flow diagram of a masterbatch process of the invention.

In the FIGURE,
A Additive addition
B Molten wax reservoir
C Blender
D Tempering/Cooling device
E Dimpled roller
F Conveyer Belt
G Comminution/Grinding/Milling
H Cross section of mould belt The process of the present invention as illustrated in FIG. 1 provides a novel way of producing a masterbatch or polymer improver by heating a wax or polymer with a low temperature and mixing the molten wax with a additives, including pigments, at a low temperature above the congealing point of the wax to create a carrier material, in doing so this process will not degrade the pigment or additive which will be mixed together.

The process includes blending a molten wax from reservoir B with one or more additives from additive tanks A in a heated or insulated blender C, whereafter the blend is cooled in a cooling tank D to just above the congealing point thereof. The cooled blend, may be termed a tempered blend, is then solidified by cooling on a dimpled chilled roller E from which the solidified blend is scraped and the particles are taken by a conveyer belt F to a milling device G where it is milled or ground to form flakes or prills of the desired size.

What is also unique is that a liquid pigment can be added and blended which will have a very high dispersion, but in its liquid form difficult to add to a polymer in a production process. As the process defined herein allows for the use of a liquid pigment and then solidified allows for a means of having the properties of a liquid pigment in solid form which can be used in a more user friendly means.

A common misconception for instance, in a white masterbatch, is that the higher the titanium dioxide content the better the product. This can be false, due to the high compacting and inadequate wetting out of the titanium dioxide the particle size is not uniform which leads to inferior dispersion as to the process mentioned here with less titanium.

This can have a cost implication, as well as technical.

Due to the higher loading and because the titanium dioxide is usually more expensive than the carrier, the final product becomes more expensive with the same or lower dispersion than with the process outlined here.

The process outlined herein with a 50% loading, performs the same, if not better than commonly manufactured products with a greater than 50% loading, therefore resulting in less use of masterbatch.

In colours, this difference becomes more pronounced.

Because a uniform base carrier material is first produced, this can be fed to a number of secondary mixing units where the additives are uniformly mixed with their own properties, for instance, one secondary mixing unit might be mixing a liquid pigment while another could be mixing a white colour and a third a calcium carbonate.

The process uses a wax, a modified wax (oxidized, functionalized), natural wax and/or specialty wax (amide, metallocene, etc.,) all can be used in this approach as well as blended waxes or waxes blended with polymers or polymer blend.

Fischer-Tropsch waxes are desirable as they have many desirable properties some of which have very high purity being essentially free of any sulphur, nitrogen and aromatic species and have high normal paraffin content. Another desirable property of Fischer-Tropsch waxes is their opacity, i.e., their lack of translucent appearance.

The invention claimed is:

1. A masterbatch preparation process, the process comprising:
   blending a molten wax, a non-wax polymer, and one or more additives; wherein:
       the non-wax polymer has a substantially higher melting point than the molten wax and is in particulate form during the blending;
   the additives comprise pigments;
   tempering the blend or cooling the blend to just above the congealing point thereof;
   solidifying the blend by cooling; and
   comminuting said solidified blend;
   wherein solidifying is achieved by dispensing the blend onto a cooled surface.

2. A process as claimed in claim 1, wherein the cooled surface is a chilled dimpled roller surface whereby upon solidifying dimple sized pellets of the blend are formed.

3. A process as claimed in claim 2, wherein the pellets are milled or ground to form fine particles of the solidified blend which are useable as a masterbatch.

4. A process as claimed in claim 1, wherein the additives further comprise polymer and filler material.

5. A masterbatch preparation process, the process comprising:
   blending a molten wax, a non-wax polymer, a fiber, and one or more additives; wherein:
       the fiber is dispersed into the masterbatch;
   tempering the blend or cooling the blend to just above the congealing point thereof;
   solidifying the blend by cooling; and
   comminuting said solidified blend;
   wherein solidifying is achieved by dispensing the blend onto a cooled surface.

6. A process as claimed in claim 1, wherein the wax has a substantially constant melting point.

7. A process as claimed in claim 6, wherein the wax is a modified wax, functionalized, natural wax, or a speciality wax, or a blend thereof.

8. A process as claimed in claim 6, wherein the wax is a Fischer-Tropsch wax.

9. A process as claimed in claim 1, wherein the additives include one or more of calcium carbonate, titanium, and pigment.

10. A masterbatch preparation process the process comprising:
    blending one or more of a molten wax and a non-wax polymer, and one or more additives,
    wherein the additives include at least pigments;
    tempering the blend or cooling the blend to just above the congealing point thereof;
    solidifying the blend by cooling; and
    comminuting the solidified blend;
    wherein:

the solidifying is achieved by dispensing the blend onto a cooled surface; and the process produces a masterbatch including in excess of 80 mass % titanium dioxide.

11. A process as claimed in claim 10, wherein the process produces a masterbatch including in excess of 90 mass % titanium dioxide.

12. A process as claimed in claim 1, which process is carried out at low temperatures of below 100° C.

13. A process as claimed in claim 1, wherein the masterbatch contains from 1 mass % to 99 mass % polymer.

14. A masterbatch prepared by the process of claim 10.

15. A masterbatch as claimed in claim 14, wherein the wax is a Fischer-Tropsch wax.

* * * * *